(12) United States Patent
Govindan et al.

(10) Patent No.: US 8,252,092 B2
(45) Date of Patent: Aug. 28, 2012

(54) WATER SEPARATION UNDER VARIED PRESSURE

(75) Inventors: Prakash N. Govindan, Cambridge, MA (US); Mostafa H. Elsharqawy, Cambridge, MA (US); John H. Lienhard, Lexington, MA (US); Syed N. Zubair, Dhahran (SA)

(73) Assignees: Massachusetts Institute of Technology, Cambridge, MA (US); Kind Fahd University of Petroleum and Minerals, Dhahran (SA)

( * ) Notice: Subject to any disclaimer, the term of this patent is extended or adjusted under 35 U.S.C. 154(b) by 402 days.

(21) Appl. No.: 12/573,221

(22) Filed: Oct. 5, 2009

(65) Prior Publication Data

US 2011/0079504 A1   Apr. 7, 2011

(51) Int. Cl.
*B01D 50/00*   (2006.01)
(52) U.S. Cl. ............... 95/211; 95/228; 95/231; 96/297; 261/117
(58) Field of Classification Search .............. 95/210, 95/211, 228, 231; 96/296, 297; 261/117; 203/10, 11, DIG. 17
See application file for complete search history.

(56) References Cited

U.S. PATENT DOCUMENTS

| | | | | |
|---|---|---|---|---|
| 2,696,465 | A | * | 12/1954 | Kittredge ................ 202/185.1 |
| 3,288,686 | A | * | 11/1966 | Othmer .......................... 203/11 |
| 4,363,703 | A | | 12/1982 | ElDifrawi et al. |
| 4,525,242 | A | * | 6/1985 | Iida ............................... 202/177 |
| 5,168,728 | A | * | 12/1992 | Djelouah et al. ............... 62/532 |
| 6,607,639 | B1 | | 8/2003 | Longer |
| 7,225,620 | B2 | | 6/2007 | Klausner et al. |
| 7,381,310 | B2 | | 6/2008 | Hernandez et al. |
| 7,431,805 | B2 | | 10/2008 | Beckman |
| 7,431,806 | B2 | | 10/2008 | Levine |
| 2002/0166758 | A1 | | 11/2002 | Vinz |
| 2005/0121304 | A1 | | 6/2005 | Beckman |

FOREIGN PATENT DOCUMENTS

| | | | |
|---|---|---|---|
| FR | 2281896 | * | 8/1975 |
| GB | 780272 A | | 7/1957 |

OTHER PUBLICATIONS

Nawayseh, N., Farid, M., Al-Hallaj, S., Al-Timimi, A., "Solar desalination based on humidification process—I. Evaluating the heat and mass transfer coefficients", Energy Conversion and Managemant, vol. 40, pp. 1423-1439., Elsevier (c)1999.*
M. Vlachogiannis, et al., "Desalination by Mechanical Compression of Humid Air," 122 Desalination 35-42 (1999).
Muller-Holst, Hendrik, "Solar Thermal Desalination Using the Multiple Effect Humidification (MEH) Method," *Solar Desalination for the 21st Century*, 215-222 (2007).
European Patent Office, "International Search Report and Written Opinion", Application No. PCT/US2010/050359, Mar. 3, 2011.

* cited by examiner

*Primary Examiner* — Robert A Hopkins
(74) *Attorney, Agent, or Firm* — Modern Times Legal; Robert J. Sayre

(57) ABSTRACT

Water is substantially separated from a liquid mixture (e.g., saline water) that includes water using a humidification chamber at a lower pressure and a dehumidification chamber at a higher pressure. A carrier gas is flowed through the humidification chamber; and inside the humidification chamber, the carrier gas directly contacts the liquid mixture to humidify the carrier gas with evaporated water from the liquid mixture to produce a humidified gas flow. The humidified gas flow is then directed through the dehumidification chamber, where water is condensed from the humidified gas flow and collected. The absolute pressure inside the humidification chamber is at least 10% lower than the absolute pressure inside the dehumidification chamber.

26 Claims, 10 Drawing Sheets

WATER SEPARATION UNDER VARIED PRESSURE

BACKGROUND

Desalination of seawater or brackish water is generally performed by either of the following two main processes: (a) by evaporation of water vapor or (b) by use of a semi-permeable membrane to separate fresh water from a concentrate. In a phase-change or thermal processes, the distillation of seawater is achieved by utilizing a heat source. In the membrane processes, electricity is used either for driving high-pressure pumps or for establishing electric fields to separate the ions.

Important commercial desalination processes based on thermal energy are multi-stage flash (MSF), multiple-effect distillation (MED) and thermal vapor compression (TVC). The MSF and MED processes consist of many serial stages at successively decreasing temperature and pressure.

The multistage flash process is based on the generation of vapor from seawater or brine due to a sudden pressure reduction (flashing) when seawater enters an evacuated chamber. The process is repeated stage-by-stage at successively decreasing pressures. Condensation of vapor is accomplished by regenerative heating of the feed water. This process requires an external steam supply, normally at a temperature around 100° C. The maximum operating temperature is limited by scale formation, and thus the thermodynamic performance of the process is also limited.

For the multiple-effect distillation system, water vapor is generated by heating the seawater at a given pressure in each of a series of cascading chambers. The steam generated in one stage, or "effect," is used to heat the brine in the next stage, which is at a lower pressure. The thermal performance of these systems is proportional to the number of stages, with capital cost limiting the number of stages to be used.

In thermal vapor compression systems, after water vapor is generated from the saline solution, the water vapor is compressed using a high pressure steam supply and nozzle and then condensed to generate potable water.

A second important class of industrial desalination processes uses membrane technologies, principally reverse osmosis (RO) and electrodialysis (ED). Reverse osmosis employs power to drive a pump that increases the pressure of the feed water to the desired value. The required pressure depends on the salt concentration of the feed. The pumps are normally electrically driven. For reverse osmosis systems, which are currently the most economical desalination systems, the cost of water production may reach US$3/m$^3$ for plants of smaller capacity (e.g., 5 to 100 m$^3$/day). Also, reverse osmosis plants require expert labor for operation and maintenance purposes. The electrodialysis process also requires electricity to produce migration of ions through suitable ion-exchange membranes. Both reverse osmosis and electrodialysis are useful for brackish water desalination; reverse osmosis, however, is also competitive with multistage flash distillation processes for large-scale seawater desalination.

The multistage flash process represents more than 75% of the thermal desalination processes, while the reverse osmosis process represents more than 90% of membrane processes for water production. Multistage flash plants typically have capacities ranging from 100,000 to almost 1,000,000 m$^3$/day. The largest reverse osmosis plant currently in operation is the Ashkelon plant, at 330,000 m$^3$/day.

Other approaches to desalination include processes such as ion-exchange, liquid-liquid extraction, and the gas hydrate process. Most of these approaches are not widely used except when there is a requirement to produce high purity (total dissolved solids <10 ppm) water for specialized applications.

Another interesting process that has garnered much attention recently is the forward osmosis process. In this process, a carrier solution is used to create a higher osmotic pressure than that of seawater. As a result the water in seawater flows through the membrane to the carrier solution by osmosis. This water is then separated from the diluted carrier solution to produce pure water and a concentrated solution that is sent back to the osmosis cell. This technology is yet to be proven commercially.

The technology that is at the root of the present invention is known as the humidification-dehumidification (HDH) process. The HDH process involves the evaporation of water from a heated water source (e.g., sea water) in a humidifier, where the evaporated water humidifies a carrier gas. The humidified carrier gas is then passed to a dehumidifier, where the water is condensed out of the carrier gas.

The predecessor of the HDH cycle is the simple solar still. In the solar still, water contained in an enclosure is heated by sunlight to cause evaporation, and the evaporated water is condensed on a glass cover of the enclosure and collected. The most prohibitive drawback of a solar still is its low efficiency (generally producing a gained-output-ratio less than 0.5). The low efficiency of the solar still is primarily the result of the immediate loss of the latent heat of condensation through the glass cover of the still. Some designs recover and reuse the heat of condensation, increasing the efficiency of the still. These designs (called multi-effect stills) achieve some increase in the efficiency of the still but the overall performance is still relatively low. The main drawback of the solar still is that the various functional processes (solar absorption, evaporation, condensation, and heat recovery) all occur within a single component.

SUMMARY

Described herein are methods and apparatus for water separation under varying pressure. Various embodiments of this invention, as characterized in the claims, may include some or all of the elements, features and steps described below.

The conventional humidification dehumidification desalination system is operated using air as a carrier gas at a single pressure. Operation at a single pressure causes the process to be energy inefficient because the water-vapor carrying capacities of the carrier gas in the humidifier and the amount of condensation in the dehumidifier are both limited.

A method for separating water from a liquid mixture that includes water uses a humidification chamber (direct-contact packed-bed humidifier) at a lower pressure and a dehumidification chamber (dehumidifying heat exchanger) at a higher pressure. In the method, a carrier gas is flowed through the humidification chamber where it directly contacts the liquid mixture and becomes humidified with evaporated water from the liquid mixture to produce a humidified gas flow. The humidified gas flow is then pressurized and directed through the dehumidification chamber, where water is condensed from the humidified gas flow and collected. The total pressure inside the humidification chamber is at least 10% lower than the total pressure inside the dehumidification chamber.

The humidifier and the dehumidifier are substantially thermally separated from each other (i.e., there is no more than minimal heat transfer via direct thermal conduction between the chambers of each; thermal energy is instead primarily transferred between the chambers via mass flow of the liquid and gas). The carrier gas can be recycled through the apparatus in a closed loop. The carrier gas and/or the liquid mixture can be heated in the apparatus, e.g., by solar energy, waste heat, or fossil fuel. Alternatively, the energy input can be provided when compressing the carrier gas to differentiate the pressure between the humidification and the dehumidification chambers. When the carrier gas is heated, it can be heated after it leaves the humidification chamber and before or after it is pressurized and enters the dehumidification chamber. All processes in the apparatus can be powered by renewable energy sources and/or by waste heat; accordingly, some realizations of the apparatus can be operated off-grid (i.e., without any electrical connection to a distributed electrical power grid) and in remote areas with few resources. The liquid mixture can be, for example, in the form of seawater, brackish water or groundwater.

The apparatus and methods, described herein, can offer some or all of the following advantages over the conventional cycle: (a) operation of the humidification process at a lower pressure can cause the moisture content of the air to be very high at the exit of the humidifier by virtue of the effect of pressure on the moisture-carrying properties of the carrier gas, hence increasing the productivity of the system; (b) the lower pressure in the humidifier can also lower the top temperature required to drive the cycle, resulting in the usage of less costly material for the system and facilitating use of lower grades of energy for reaching the desired temperatures; (c) operation of the dehumidification process at a higher pressure can result in increased condensation and hence cause an increase in the water production; (d) higher heat recovery can be achieved because the energy is added to the cycle at an optimum point (between the humidifier and the dehumidifier), resulting in an increased system efficiency; and (e) usage of the multi-extraction concept can allow for minimizing entropy generation in the humidification and the dehumidification chambers and thus can create an opportunity to further enhance the system efficiency.

In a simulation, a thermodynamic analysis of the system showed that a gained output ratio of up to 15 can be achieved, which is roughly twice the value of the currently available systems based on evaporation and condensation with a carrier gas. The inventors believe that this increase in efficiency will make the currently expensive humidification-dehumidification system much more economically feasible.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

DETAILED DESCRIPTION

Figure 1:
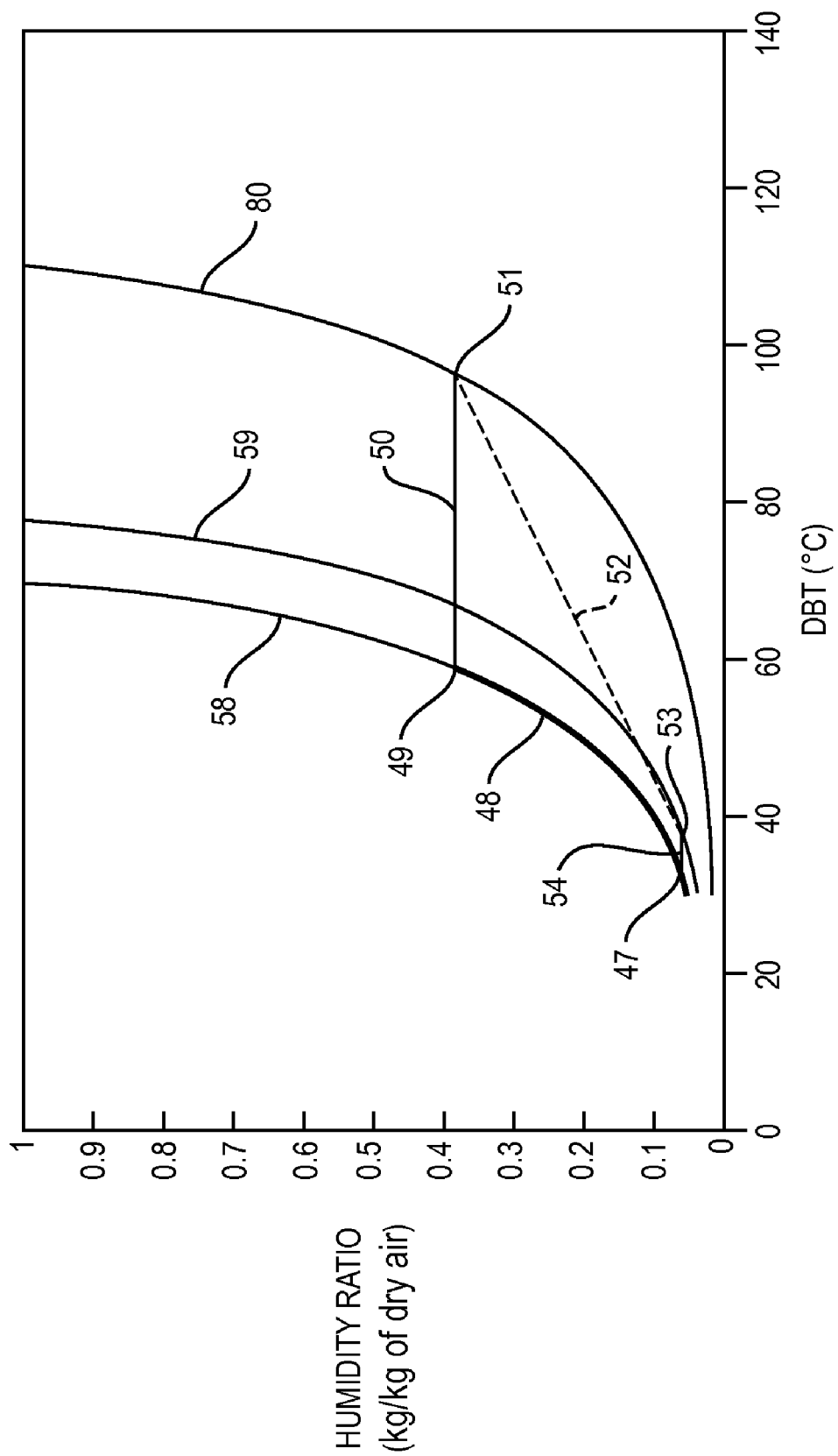
FIG. 1 shows the process paths that the carrier gas follows for a varying pressure humidification-dehumidification system in terms of the humidity ratio as a function of dry-bulb temperature (DBT).

The foregoing and other features and advantages of various aspects of the invention(s) will be apparent from the following, more-particular description of various concepts and specific embodiments within the broader bounds of the invention (s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

The terminology used herein is for the purpose of describing particular embodiments and is not intended to be limiting of the invention. As used herein, the singular forms "a," "an"and "the" are intended to include the plural forms as well, unless the context clearly indicates otherwise. Additionally, the terms, "includes," "including," "comprises" and "comprising,"specify the presence of the stated elements or steps but do not preclude the presence or addition of one or more other elements or steps.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. For example, if a particular composition is referenced, practical, imperfect realities may apply; e.g., the potential presence of at least trace impurities (e.g., at less than 0.05% by weight or volume) can be understood as being within the scope of the description.

Although the terms, first, second, third, etc., may be used herein to describe various elements, these elements should not be limited by these terms. These terms are only used to distinguish one element from another. Thus, a first element, discussed below, could be termed a second element without departing from the teachings of the exemplary embodiments.

In this disclosure, when an element is referred to as being, for example, "on,""connected to" or "coupled to" another element, it may be directly on, connected or coupled to the other element or intervening elements may be present. Additionally, spatially relative terms, such as "above," "upper," "beneath," "below," "lower," and the like, may be used herein for ease of description to describe the relationship of one element to another element, as illustrated in the figures. It will be understood that the spatially relative terms are intended to encompass different orientations of the apparatus in use or operation in addition to the orientation depicted in the figures.

As used herein, the gained-output-ratio (GOR) is the ratio of the latent heat of evaporation of the distillate produced to the energy input (e.g., net heat absorbed by one or more solar collectors or the net heat input to the system by other means). The GOR represents the energy efficiency of water production and an index of the amount of the heat recovery effected in the system.

As used herein, the terminal temperature difference (TTD) is the stream-to-stream temperature difference at either end of the humidifier and dehumidifier, presented as the minimum of the two terminal temperature differences in systems without extraction.

The humidification-dehumidification (HDH) cycle involves the humidification of a carrier gas (e.g., selected from air, nitrogen, etc.) by a liquid mixture that includes water followed by the dehumidification of the humidified carrier gas to release pure water.

The separation of the humidification and dehumidification functions into distinct components in a humidification-dehumidification apparatus can reduce thermal inefficiencies and improve overall performance. For example, recovery of the latent heat of condensation in the humidification-dehumidification process is affected in a separate heat exchanger (i.e., the dehumidifier) in which the seawater, for example, can be preheated. Additionally, the module for solar collection can be optimized almost independently of the humidification or condensation component. The humidification-dehumidification process thus can provide higher productivity due to the separation of the basic processes.

Using the apparatus, described below, the principle of humidification-dehumidification of a carrying gas is utilized to separate water from a liquid mixture. The liquid mixture can be in the form of a solution with dissolved components (such as salts) and/or a mixture containing solids and/or other liquids. The process is herein described in the context, for example, of water desalination, where pure water is separated from salt water, though the process and apparatus can likewise be utilized in the context of separating water from other liquid mixtures.

The water separation process, described herein, works on a humidification-dehumidification principle. A carrier gas (e.g., selected from air, nitrogen, etc.) that has the ability to carry water vapor is used as a medium for separating substantially pure water from a liquid mixture (e.g., seawater, brackish water, etc.). The water component of the liquid mixture is evaporated into the carrier gas by means of a humidification process. The carrier gas is saturated with water vapor in the humidifier. The moisture-laden low-pressure carrier gas is then compressed to a higher pressure in a compressor and sent to a dehumidifier that condenses out the water from the gas. The dehumidification process also results in heating of the liquid mixture that is eventually used to irrigate the humidifier.

The carrier gas thus undergoes the humidification process at a lower pressure and the dehumidification process at a higher pressure. The pressure ratio (i.e., the ratio of the absolute pressure in the dehumidification chamber to the absolute pressure in the humidification chamber) can be, for example, above 1.1, including, e.g., 1.6 or 2 or another value. This pressure differential creates an opportunity for greater heat recovery for the following reasons: (1) the heat recovered in the dehumidifier from the carrier gas to pre-heat the liquid mixture is of higher grade (higher temperature), and (2) the carrier gas itself gets heated (apart from getting humidified) in the humidifier by virtue of being at a lower temperature than the liquid mixture. The average-temperature difference between the chambers can be at least 4° C., for example, in the range from 10° to 70° C. (with the average temperature in the dehumidification chamber being higher than the average temperature in the humidification chamber).

Accordingly, the energy for the cycle is input into the carrier gas after humidification in the form of compression, and the carrier gas is then dehumidified. The carrier gas after dehumidification can be expanded by an expander to a lower pressure; and a part of the compressor work can be supplied by the work extracted from the expansion process, for example, by coupling the expander to the same shaft as the compressor or by using a motor-generator arrangement to transfer the expander work to the compressor. Also the differentiation of pressure raises the humidity in the carrier gas at the exit of the humidifier and lowers the humidity in the carrier gas upon exiting the dehumidifier, thereby increasing the production of substantially pure water. Cooling of the carrier gas via expansion en route to the humidifier results in a lower temperature in the humidifier, which also improves the performance of the cycle.

In the water separation cycle, described herein, the carrier gas goes through several processes. FIG. 1 shows these processes in a psychometric chart. The psychometric chart shows the humidity ratio in the carrier gas against the dry-bulb temperature (DBT). 58, 59 and 80 represent constant relative humidity lines where line 58 represents 100% relative humidity. Part 48 of the curve 58 represents the humidification process. Point 47 represents the state of air at the inlet to the humidifier, and point 49 represents the state at the exit to the humidifier. During this humidification process, both the humidity ratio and the dry-bulb temperature increase. The humidified air is then compressed along a constant-humidity-ratio line 50 from point 49 to point 51. After compression and the resulting increase in dry-bulb temperature, water is extracted from the carrier gas in the dehumidifier; and the process is represented by the curve 52, from point 51 to point 53, wherein both the humidity and the dry-bulb temperature of the carrier gas decrease. Finally, the carrier gas is expanded in an expander along a constant-humidity-ratio line 54 from point 53 back to point 47, dropping back down to the original low dry-bulb temperature.

Figure 2:
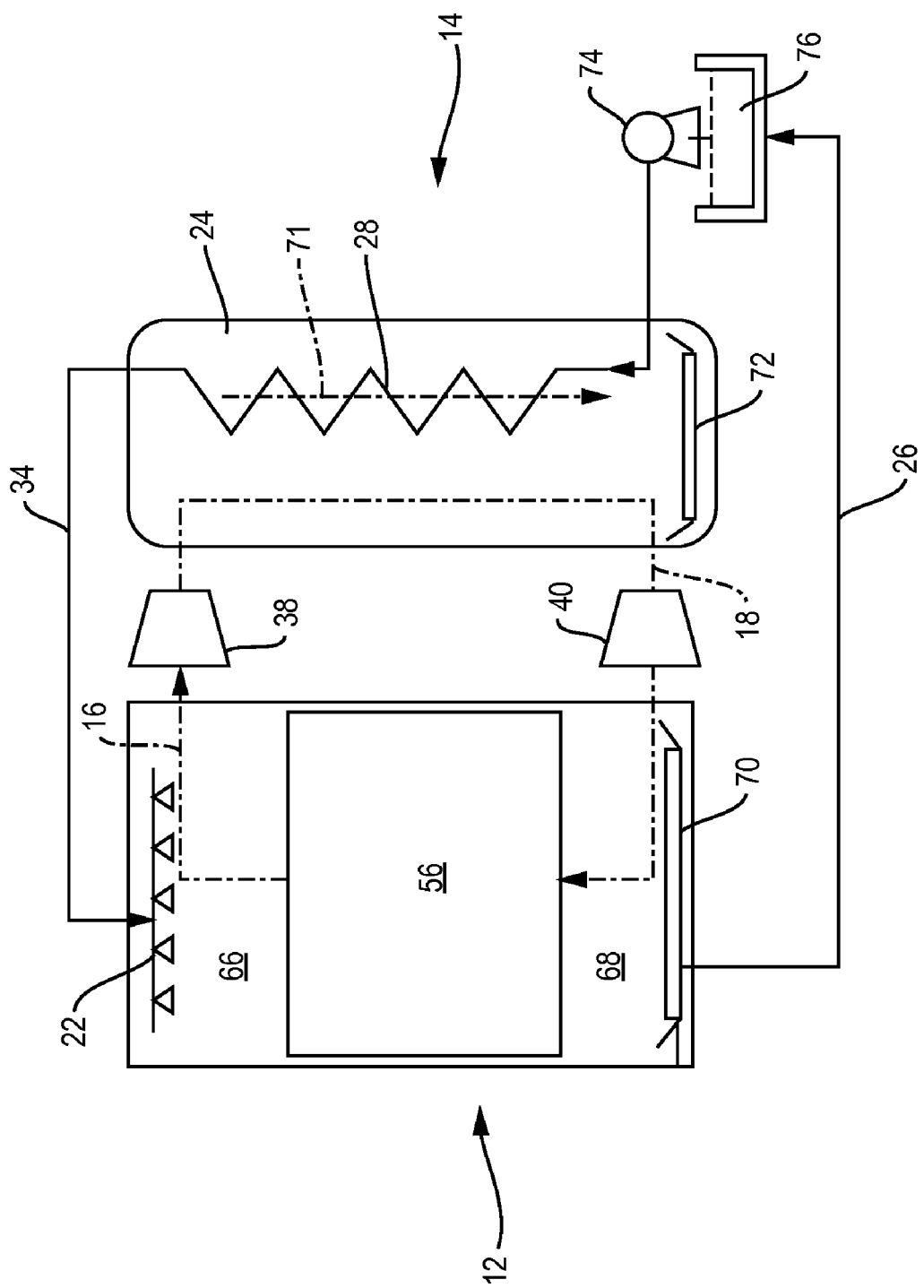
FIG. 2 is a schematic illustration of a varying pressure system operating with a closed loop for the carrier gas.

FIG. 2 schematically illustrates the system for carrying out these processes. In this illustration, we see that the carrier gas (such as air, nitrogen, etc.) is circulated through carrier-gas conduits 16 and 18 between a humidifier 12 and a dehumidifier 14 in, e.g., a closed loop. The carrier gas is introduced into the humidifier 12 via carrier-gas conduit 16, while a liquid mixture is sprayed from nozzle 22 in the humidifier 12. Some of the liquid mixture will evaporate and humidify the carrier gas, while a non-evaporated portion of the liquid mixture will be captured in brine collection tray 70 and recirculated through conduit 26.

The carrier-gas conduit 16 that takes the humidified carrier gas from the carrier-gas output of the humidifier 12 to the carrier-gas input of the dehumidifier 14 passes through a compressor 38 that compresses the humidified carrier gas to a higher pressure and raises the temperature of the carrier gas. The compressor 38 can be, for example, a thermo-compressor in the form of a steam-jet ejector employing a Venturi.

The humidified carrier gas is directed from the compressor 38 to the dehumidifier 14, where the carrier gas is dehumidified in a dehumidification chamber 24 using the cold inlet liquid mixture pumped by water pump 74 through a liquid-mixture input conduit 26 that draws the liquid mixture from the liquid-mixture reservoir 76 to provide a substantially constant mass flow to and through a coiled liquid-mixture conduit 28 inside the dehumidification chamber 24, allowing for thermal energy transfer from the gas to the liquid mixture inside the dehumidifier 14. The water vapor in the gas therefore condenses (along path 71) and is collected as substantially pure water in a distillate collection tray 72 at the bottom of the dehumidification chamber 24. The collected pure water, can then be removed from the dehumidifier 14 for use, e.g., as drinking water, for watering crops, for washing/cleaning, for cooking, etc.

Meanwhile, the carrier-gas conduit 18 recycling the carrier gas from the carrier-gas output of the dehumidifier 14 back to the carrier-gas input of the humidifier 12 passes through an expander 40 that expands the carrier gas to reduce its pressure and its temperature before it is reintroduced into the humidification chamber 20. The expander 40 can be, for example, a throttle valve, a nozzle or a turbine.

Additionally, the pump 74, which can be powered by a photovoltaic solar panel or by a wind turbine, supplies the liquid mixture to the system from a water tank 76. The water tank 76 may be connected to a large body of the liquid mixture (e.g., sea, ocean, groundwater, etc.) in which the water concentration of the liquid mixture does not change with evaporation in the humidifier. Otherwise, water concentration in the tank 76 can be monitored and blow-down and make up can be provided to keep the water concentration in tank 76 within an operating limit.

Figure 3:
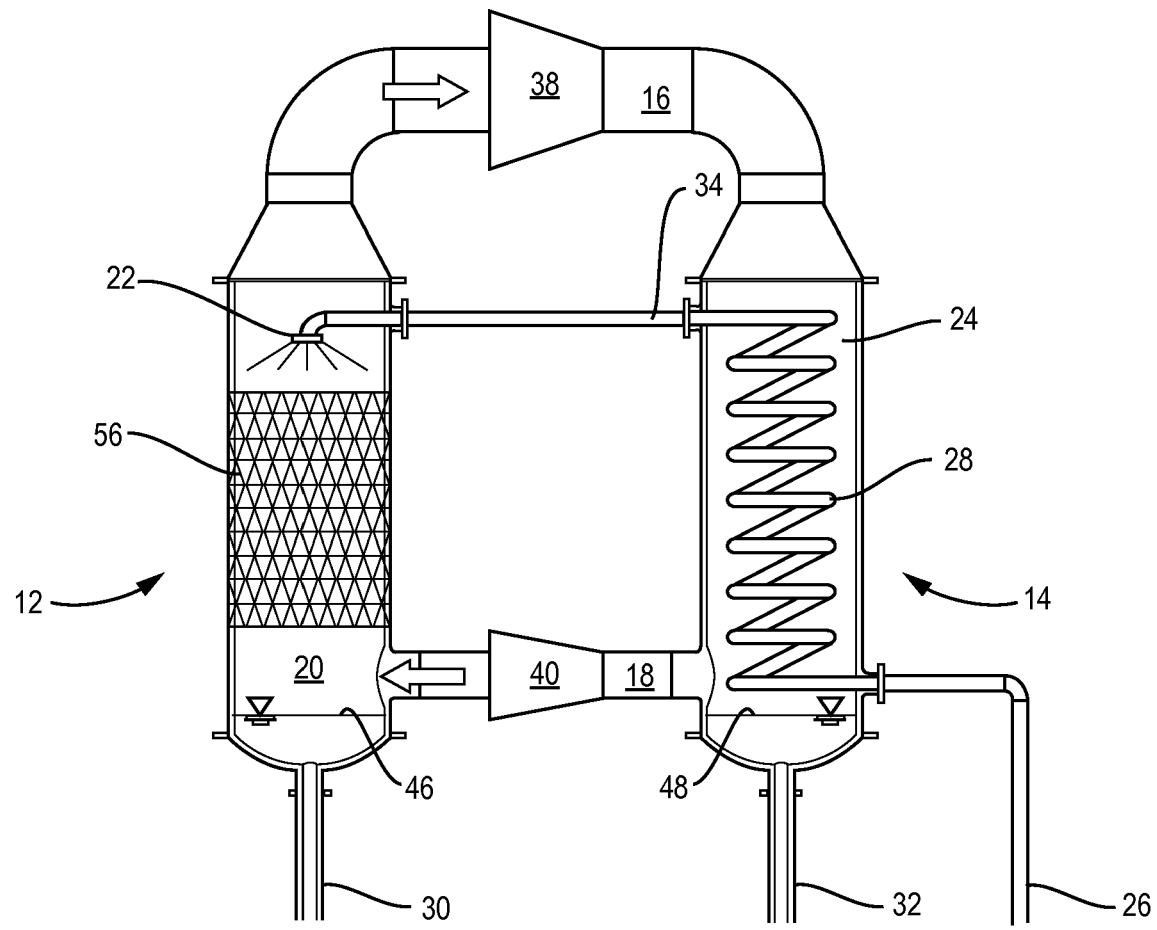
FIG. 3 is an illustration of the apparatus of a varying pressure system operating with a closed loop for the carrier gas.

As shown in FIG. 3, the humidification chamber 20 can be filled with a packing material 56 in the form, e.g., of polyvinyl chloride (PVC) packing to facilitate turbulent gas flow and to increase the liquid surface area that is in contact with the carrier gas. The body of the humidifier (and the dehumidifier) can be formed, e.g., of stainless steel and is substantially vapor impermeable; seals formed, e.g., of epoxy sealant, gaskets, O-rings, welding or similar techniques, are provided at the vapor and water inputs and outputs of the humidifier and at the interfaces of each modular component and adjoining conduits to maintain vacuum in the system. In one embodiment, humidification chamber 20 is substantially cylindrical with a height of about 1.5 m and a radius of about 0.25 m.

The humidifier 12 and dehumidifier 14 are of a modular construction (i.e., separate parts) and are substantially thermally separated from one another. The characterization of the humidifier 12 and dehumidifier 14 as being "substantially thermally separated" is to be understood as being structured for little or no direct conductive thermal energy transfer through the apparatus between the humidification and dehumidification chambers, though this characterization does not preclude a mass flow carrying thermal energy (via gas and/or liquid flow) between the chambers. This "substantial thermal separation" characterization thereby distinguishes the apparatus from, e.g., a dewvaporation apparatus, which includes a shared heat-transfer wall between the humidifier and the dehumidifier. In the apparatus of this disclosure, the humidifier and dehumidifier need not share any common walls that would facilitate conductive heat transfer there between.

As can be pictured via the image of FIG. 3, humidification of the carrier gas is achieved by spraying the liquid mixture from one or more nozzles 22 into a spray zone (66 in FIG. 2) at the top of the humidifier 12 then through a packing material 56 and down through a rain zone (68 in FIG. 2) to a surface 46 of collected liquid mixture at the bottom of the chamber, while the carrier gas moves up through the humidification chamber 20, as shown, and is brought into contact with the liquid mixture, particularly in the bed of packing material 56, to add water vapor from the liquid mixture to the carrier gas.

Figure 4:
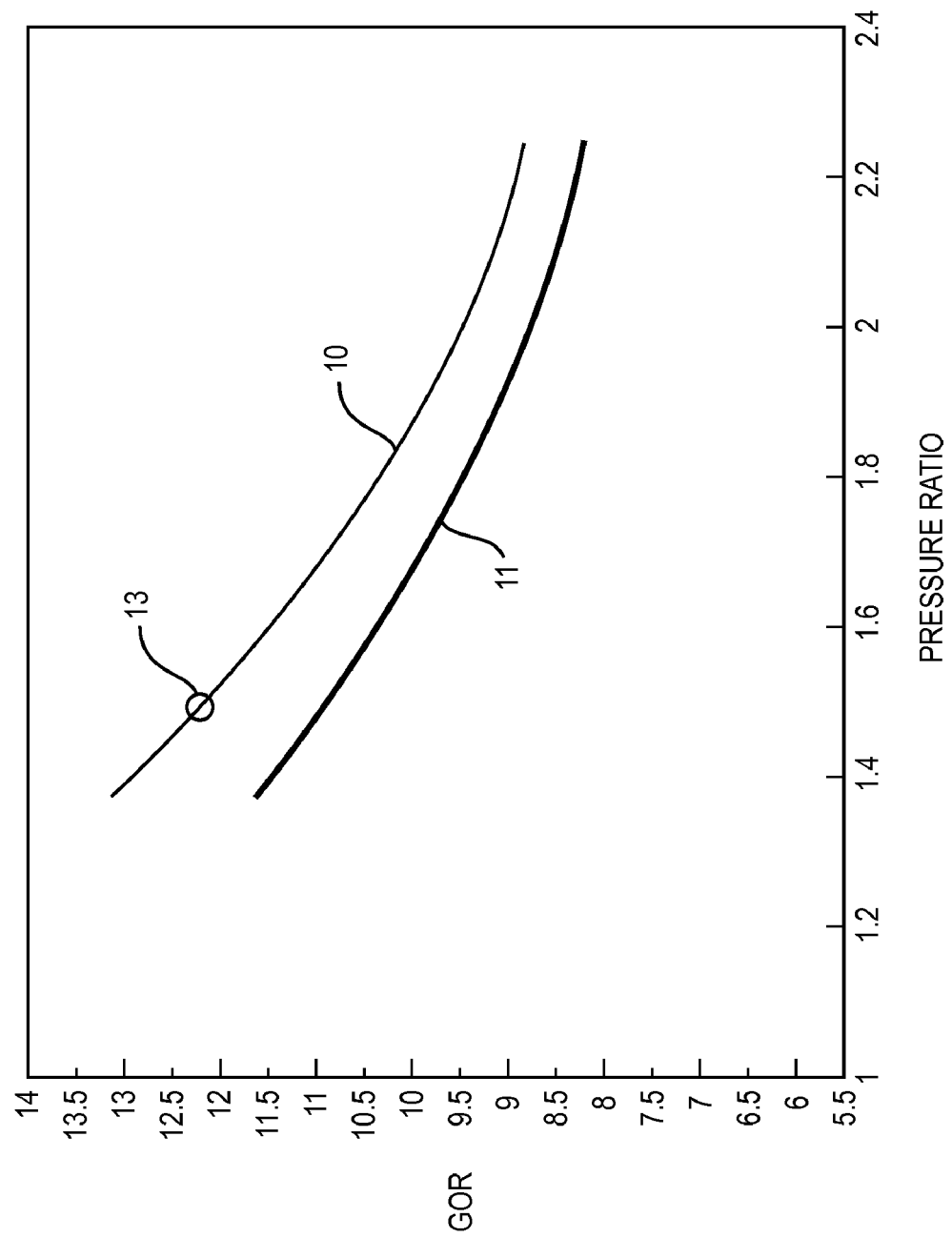
FIG. 4 is a chart demonstrating the performance of a varying pressure cycle with and without work recovery.

The performance curves for an example of a two-pressure system operating at a humidifier pressure of 40 kPa and feed water temperature of 30° C. are shown in FIG. 4, which plots the GOR as a function of pressure ratio both with work recovery 10 and without work recovery 11. This plot was generated for a system with component efficiencies for the compressor and the expander of 90% and the component effectiveness for humidifier, the dehumidifier also of 90%. It can be seen that high values of GOR ranging from 8 to 11.5 can be achieved for this system. Also, an efficient work recovery device will reduce the energy demand by 10-15%. For example, this system has a GOR of 12.2 at point 13. Point 13 is a plot with work recovery, where the pressure exiting the humidifier is 40 kPa; the pressure ratio is 1.5; humidifier TTD is 3.4K; and dehumidifier TTD is 5.1K.

Figure 5:
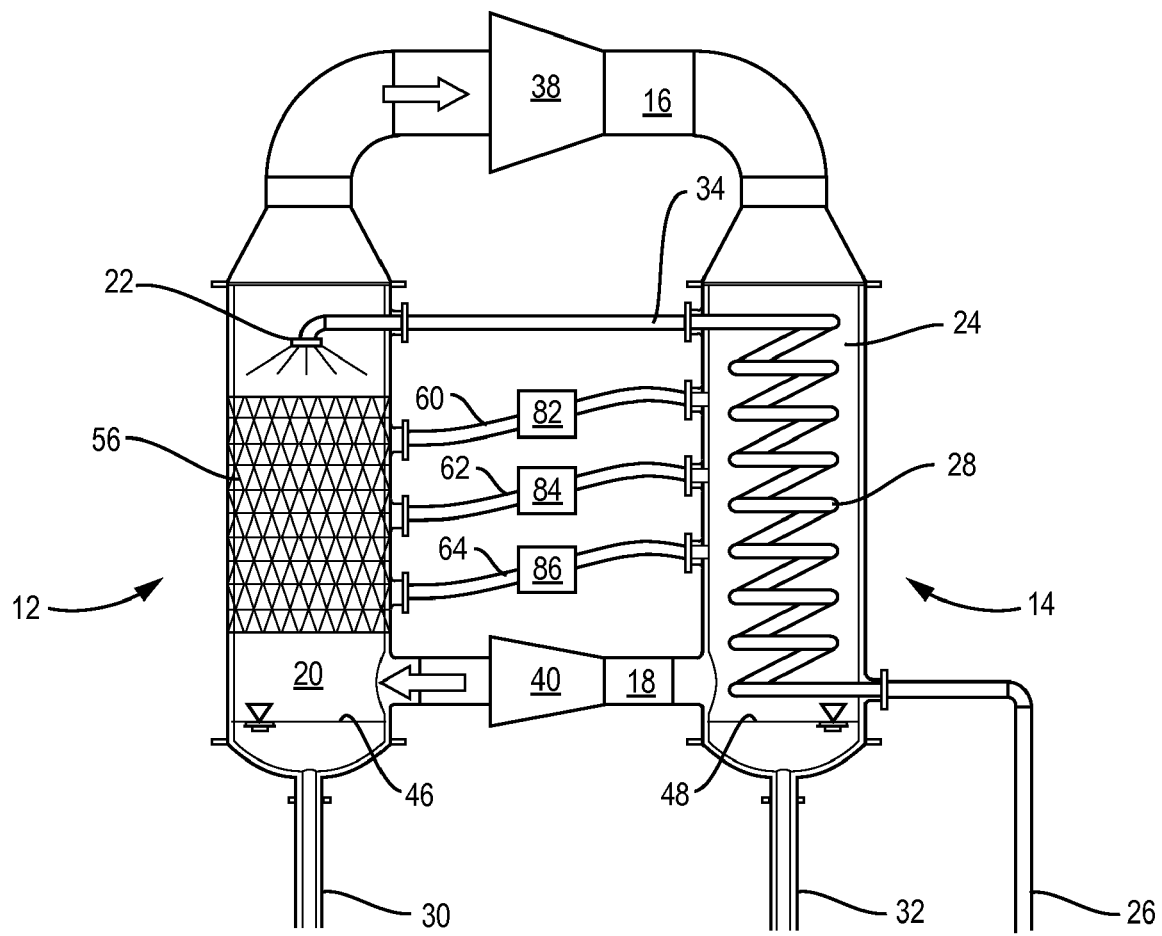
FIG. 5 shows an apparatus for a varying pressure multi-extraction system operating with a closed loop for the carrier gas.

FIG. 5 illustrates an embodiment of the invention that uses a multi-extraction humidification system, wherein the gas is extracted at multiple locations from the humidifier or the dehumidifier and supplied at corresponding locations to the dehumidifier or the humidifier, respectively, facilitating reduced entropy generation in the components and, hence, higher system performance. In this illustration, components 82, 84, 86 on gas conduits 60, 62, 64 are used for the extraction of carrier gas at strategic points from the humidifier or the dehumidifier. Components 82, 84, 86 act as pressure reducing or increasing devices depending on the direction of extraction. Examples of components that can serve this purpose include expanders and compressors. The gas can flow through the conduits naturally, or the flow can be powered by a fan in one or more of the conduits. The amount of gas extracted through an intermediate conduit depends strongly on the operating temperatures, and this amount can be controlled by components 82, 84 and 86. Providing multiple extractions can serve to essentially break up the humidifier 12 and dehumidifier 14 into a number of smaller parts with different values of mass flow ratio and to thereby balance heat capacity rates across the humidification chamber 20 and/or across the dehumidification chamber 24.

Figure 6:
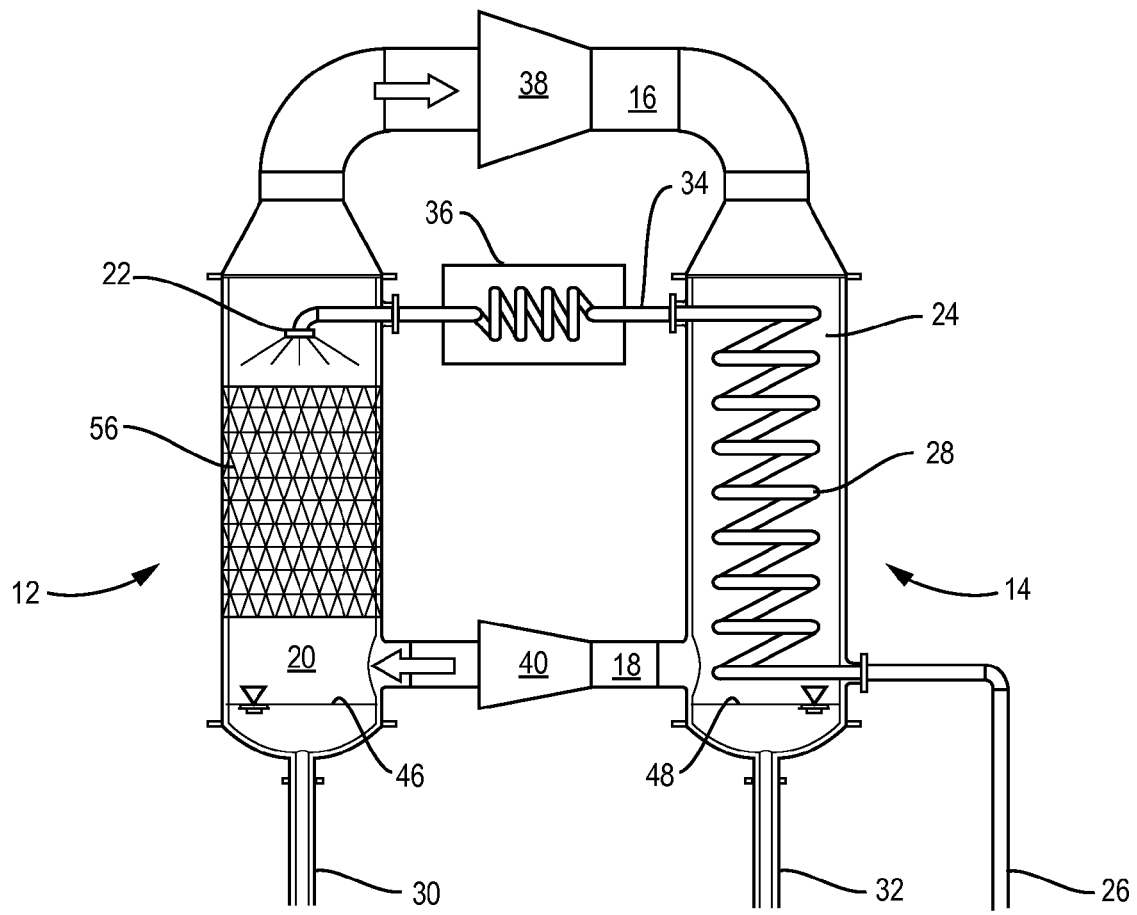
FIG. 6 shows an apparatus for a varying pressure system operating with a closed loop for the carrier gas and using a water heater to heat the liquid mixture.

As shown in FIG. 6, which otherwise resembles the apparatus of FIG. 2, a water heater 36 can be included in or along the conduit 34 to further heat the liquid mixture before entering the humidifier 12. The water heater 36 may use a solar energy source (e.g., the water heater may be in the form of a flat plate solar collector) and/or may use any waste heat source (e.g., use waste heat generated by other nearby machinery or by a power generating apparatus or by 'spent' steam discharged from a steam turbine power plant) to heat the liquid mixture.

Figure 7:
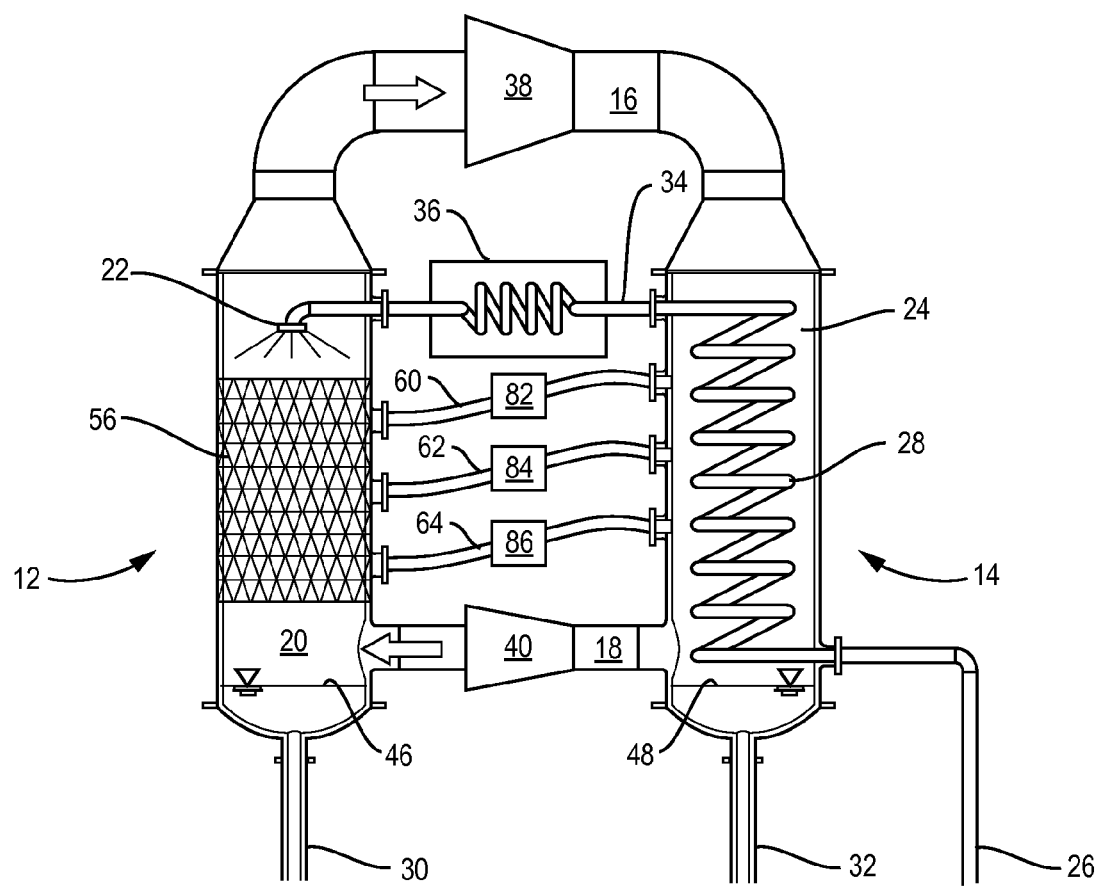
FIG. 7 shows an apparatus for a varying pressure multi-extraction system operating with a closed loop for the carrier gas and using a water heater to heat the liquid mixture.

The water-separation apparatus of FIG. 7 is similar to that of FIG. 5, except that the apparatus of FIG. 7 includes a water heater 36 coupled with conduit 34 to heat the liquid mixture en route from the dehumidifier 14 to the humidifier 12. This apparatus represents another arrangement of the multi-extraction scheme used to manipulate the mass flow rate of the carrier gas to optimize the components for entropy production considerations.

Figure 8:
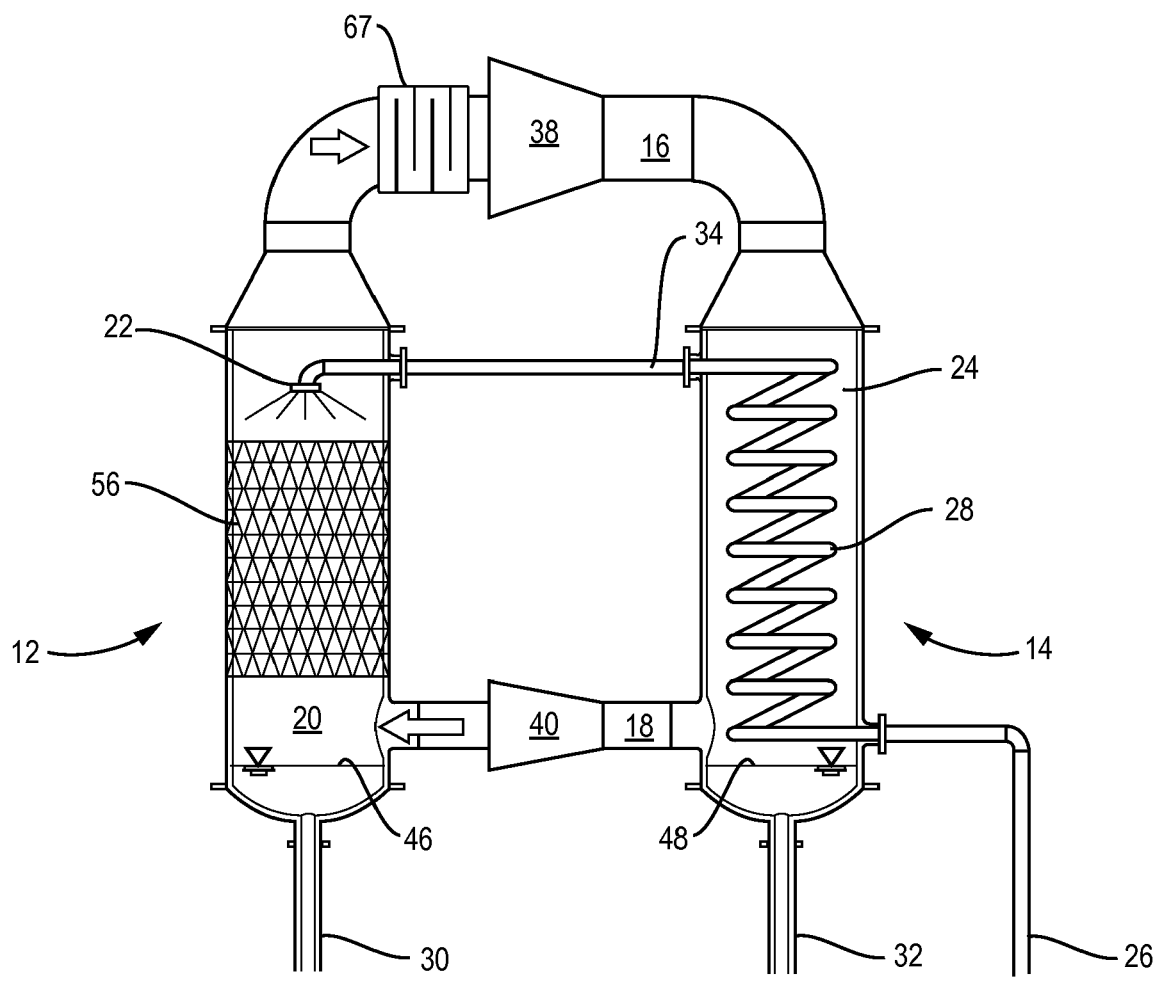
FIG. 8 shows an apparatus for a varying pressure system operating with a closed loop for the carrier gas and using a carrier gas heater to heat the carrier gas before compression.

Instead of directly heating the liquid mixture, as shown in FIGS. 6 and 7, the circulated carrier gas can be heated by a gas heater 67 in carrier-gas conduit 16 after the carrier gas passes through the humidifier 12, as shown in FIG. 8, which features a closed-loop for the carrier gas. The gas heater 67 can be, e.g., a solar air heater. Heating the humidified carrier gas, in turn, heats the liquid mixture in the dehumidification chamber 24. In the apparatus of FIG. 8, the heater 67 is positioned between the humidifier 12 and the compressor 38 to heat the humidified carrier gas before it reaches the compressor 38. Alternatively, the heater 67 can be positioned between the compressor 38 and the dehumidifier 14 to heat the humidified carrier gas after compression.

Figure 9:
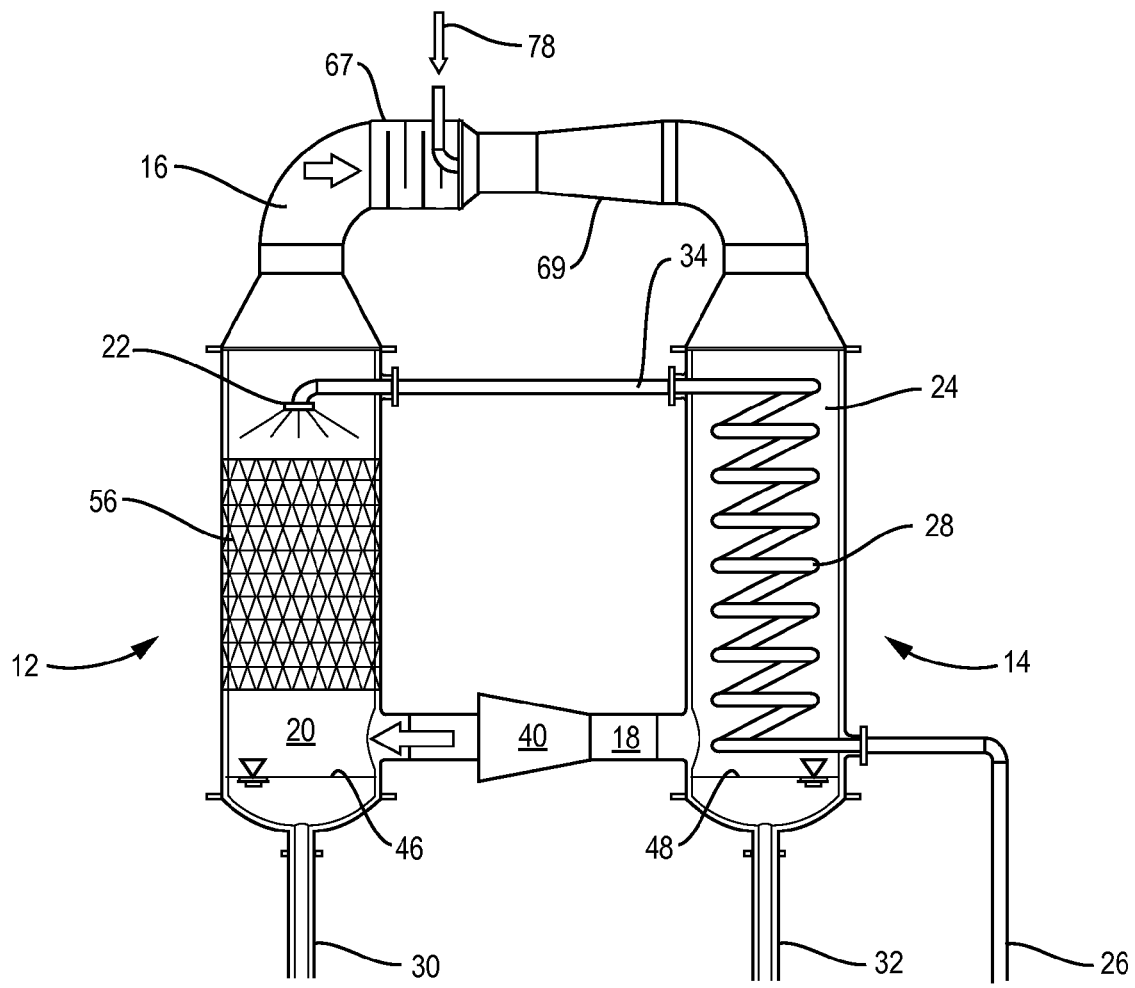
FIG. 9 shows an apparatus for a varying pressure system operating with a closed loop for the carrier gas using a thermocompressor to compress the carrier gas and an optional carrier gas heater to heat the carrier gas before compression.

Another embodiment of the gas heated cycle configuration is shown in FIG. 9, wherein the compression is carried out by a thermo-compressor 69 using a steam supply 78. In an example of this embodiment, the thermo-compressor can compress the carrier gas from 40 kPa to 60 kPa using saturated steam (e.g., from an associated power plant) at pressure of 100 kPa. The ratio of the mass of steam for the thermo-compressor to the mass of water produced is about 0.1; and only about 6 kg of steam is used for every 100 kg of carrier gas circulated in the system. A GOR of 7.7 can be achieved in this case. In another alternative embodiment, the compressor 38 can be a mechanical compressor.

Figure 10:
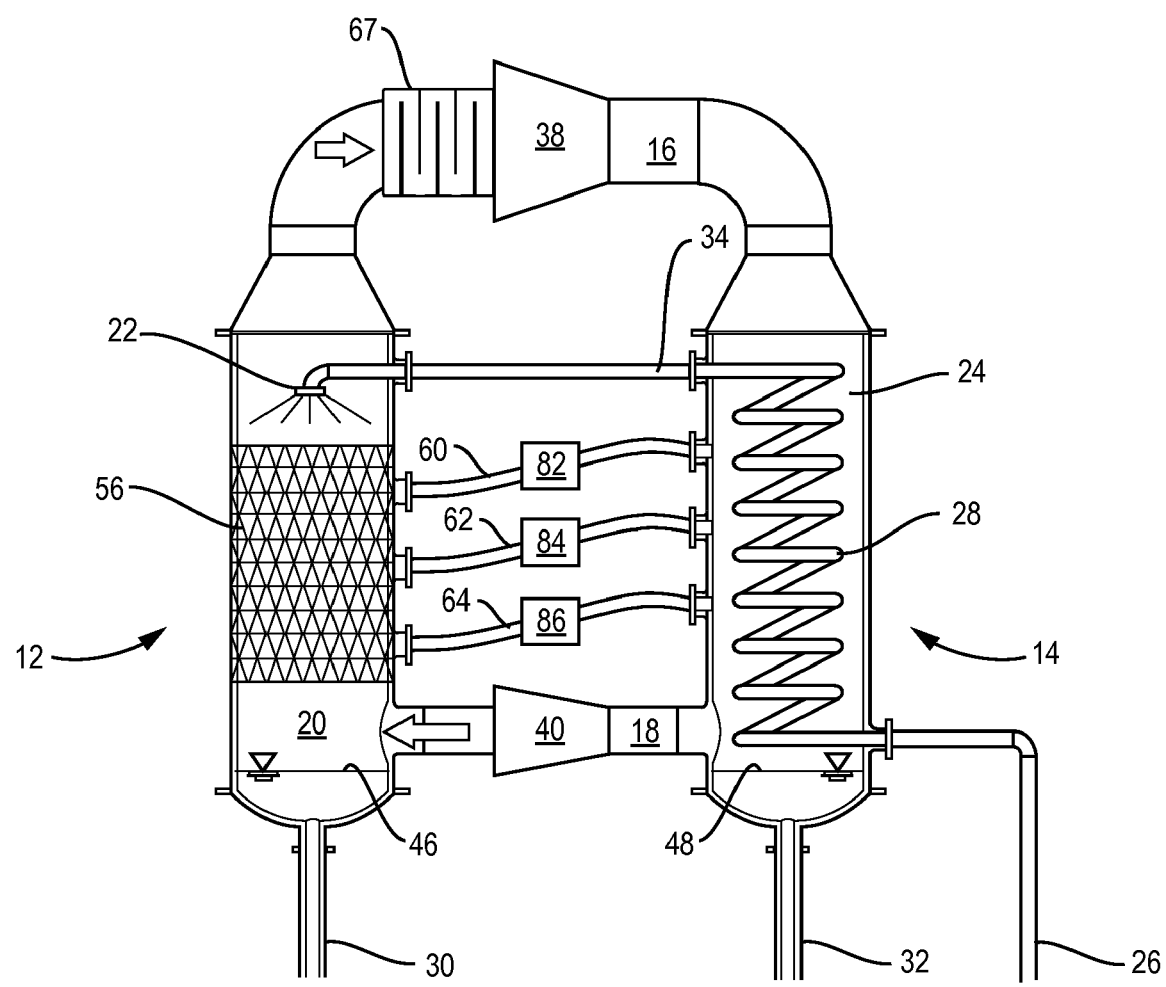
FIG. 10 shows an apparatus for a varying pressure multi-extraction system operating with a closed loop for the carrier gas and using a carrier gas heater to heat the carrier gas before compression.

The multi-extraction system of FIG. 10 is similar to the system of FIG. 8, except it includes intermediate gas conduits 60, 62 and 64 with pressure reducing/increasing components 82, 84 and 86 that help to manipulate the mass flow rate of the carrier gas stream.

In describing embodiments of the invention, specific terminology is used for the sake of clarity. For purposes of description, each specific term is intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $3/4^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of all references, including reference texts, journal articles, patents, patent applications, etc., cited throughout the text are hereby incorporated by reference in their entirety. Appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for substantially separating water from a liquid mixture including water, the method comprising:
   directing a flow of a carrier gas through in at least one direct-contact packed-bed humidifier;
   directly contacting the carrier gas flow with the liquid mixture in the direct-contact packed-bed humidifier to humidify the carrier gas with water evaporated from the liquid mixture, producing a humidified gas flow;
   compressing the humidified gas flow;
   directing the compressed humidified gas flow through at least one dehumidifying heat exchanger;
   dehumidifying the compressed humidified gas flow in the dehumidifying heat exchanger to condense water from the compressed humidified gas flow, wherein the absolute pressure in the dehumidifying heat exchanger as the water is condensed is at least 10% greater than the absolute pressure in the direct-contact packed-bed humidifier as the water is evaporated, and wherein the dehumidifying heat exchanger is substantially thermally separated from the direct-contact packed-bed humidifier such that thermal energy is conducted from the dehumidifying heat exchanger to the direct-contact packed-bed humidifier primarily via mass flow of the carrier gas and the liquid mixture rather than via a heat transfer driven by a temperature difference;
   recirculating the dehumidified gas flow from the dehumidifying heat exchanger back through the direct-contact packed-bed humidifier, where the dehumidified gas is reused as the carrier gas, in a closed loop;
   expanding the dehumidified gas flow to decrease its pressure as the dehumidified gas flow is recirculated from the dehumidifying heat exchanger to the direct-contact packed-bed humidifier, also allowing for extraction of work from the expansion process; and
   collecting the water condensed in the dehumidifying heat exchanger.

2. The method of claim 1, further comprising supplying at least part of the energy for compression of the humidified gas flow from the expansion of the dehumidified gas flow.

3. The method of claim 1, wherein the dehumidifier and the humidifier each have a modular construction.

4. The method of claim 1, wherein the dehumidification of the compressed humidified gas flow is conducted at a temperature higher than the temperature at which humidification of the carrier gas flow is conducted.

5. The method of claim 4, wherein the difference between the average temperature in the dehumidifying heat exchanger and the average temperature in the direct-contact packed-bed humidifier is at least 4° C.

6. The method of claim 1, wherein the humidified gas flow is compressed by a compressor selected from a mechanical compressor and a thermocompressor.

7. The method of claim 6, wherein the compressor compresses the humidified gas to a pressure at least about 50% greater than the pressure of the humidified gas flow as it leaves the direct-contact packed-bed humidifier.

8. The method of claim 6, wherein the gas flow is extracted from at least one intermediate location in the direct-contact packed-bed humidifier or in the dehumidifying heat exchanger and fed from each extracted intermediate location to a corresponding intermediate location in the dehumidifying heat exchanger or in the direct-contact packed-bed humidifier, respectively, allowing for manipulation of gas mass flows.

9. The method of claim 1, wherein the pressure in the direct-contact packed-bed humidifier as water is evaporated is less than ambient atmospheric pressure.

10. The method of claim 9, wherein the dehumidification pressure is greater than ambient atmospheric pressure.

11. The method of claim 1, further comprising heating the liquid mixture before it enters the direct-contact packed-bed humidifier.

12. The method of claim 11, wherein the liquid mixture is heated via solar energy.

13. The method of claim 11, wherein the gas flow is extracted from at least one intermediate location in the direct-contact packed-bed humidifier or in the dehumidifying heat exchanger and fed from each extracted intermediate location to a corresponding intermediate location in the dehumidifying heat exchanger or in the direct-contact packed-bed humidifier, respectively, allowing for manipulation of gas mass flows.

14. The method of claim 1, further comprising directing the liquid mixture through the dehumidifier, where the liquid mixture is heated, without the liquid mixture directly contacting the gas flow in the dehumidifier and feeding the heated liquid mixture from the dehumidifier through the humidifier.

15. The method of claim 14, further comprising circulating non-evaporated remains of the liquid mixture from the humidifier through the dehumidifier and then back through the humidifier in a closed loop.

16. The method of claim 15, further comprising maintaining a substantially constant mass flow of the liquid mixture by also feeding an external supply of the liquid mixture through the dehumidifier and then through the humidifier.

17. The method of claim 1, further comprising heating the humidified gas flow before it enters the dehumidifying heat exchanger.

18. The method of claim 17, wherein the humidified gas flow is heated via solar energy.

19. The method of claim 17, wherein the gas flow is extracted from at least one intermediate location in the direct-contact packed-bed humidifier or in the dehumidifying heat exchanger and fed from each extracted intermediate location to a corresponding intermediate location in the dehumidifying heat exchanger or in the direct-contact packed-bed humidifier, respectively, allowing for manipulation of gas mass flows.

20. The method of claim 1, wherein the humidified gas flow is compressed by a compressor powered by a photovoltaic device.

21. The method of claim 1, wherein the apparatus is operated free of any electrical coupling to an electrical power grid that is external to the system.

22. The method of claim 1, wherein the liquid mixture is selected from seawater, brackish water or groundwater.

23. The method of claim 1, wherein the humidified gas flow is heated before compression, and wherein the compression of the humidified gas flow is performed by a thermo-compressor using steam to compress the humidified gas flow before the humidified gas flow enters the dehumidifier.

24. An apparatus for substantially separating water from a liquid mixture including water, the apparatus comprising:
- a humidifier including containing a packed bed and in fluid communication with a carrier-gas input and output and a liquid-mixture input and output;
- a dehumidifier including a dehumidifying heat exchanger in fluid communication with a carrier-gas input and a carrier-gas output, wherein the dehumidifying heat exchanger is substantially thermally separated from the humidifier;
- a carrier-gas conduit coupling the carrier-gas output of the humidifier and the carrier-gas input of the dehumidifier for gas flow therebetween; and
- a compressor in or on the gas conduit to compress the carrier gas passing from the humidifier to the dehumidifier.

25. The apparatus of claim 24, further comprising:
- a second carrier-gas conduit coupling the carrier-gas output of the dehumidifier and the carrier-gas input of the humidifier for gas flow therebetween; and
- an expander in or on the second gas conduit to expand the carrier gas passing from the dehumidifier to the humidifier.

26. The apparatus of claim 24, further comprising a liquid-mixture conduit passing through the dehumidifier and coupled with the liquid-mixture input of the humidifier.

* * * * *

UNITED STATES PATENT AND TRADEMARK OFFICE
CERTIFICATE OF CORRECTION

PATENT NO. : 8,252,092 B2  
APPLICATION NO. : 12/573221  
DATED : August 28, 2012  
INVENTOR(S) : Prakash N. Govindan et al.

Page 1 of 1

It is certified that error appears in the above-identified patent and that said Letters Patent is hereby corrected as shown below:

On the Title page, item [75] in the list of inventors, replace "Syed N. Zubair" with "Syed M. Zubair".

Signed and Sealed this
Twenty-ninth Day of January, 2013

David J. Kappos
*Director of the United States Patent and Trademark Office*